US007624141B2

(12) United States Patent
Cabrera et al.

(10) Patent No.: US 7,624,141 B2
(45) Date of Patent: Nov. 24, 2009

(54) DETERMINISTIC RULE-BASED DISPATCH OF OBJECTS TO CODE

(75) Inventors: Luis Felipe Cabrera, Bellevue, WA (US); George P. Copeland, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 10/763,530

(22) Filed: Jan. 23, 2004

(65) Prior Publication Data

US 2005/0198108 A1    Sep. 8, 2005

(51) Int. Cl.
G06F 15/16    (2006.01)
(52) U.S. Cl. .................... 709/201; 709/202; 709/240
(58) Field of Classification Search ............... 709/201
See application file for complete search history.

(56) References Cited

U.S. PATENT DOCUMENTS

| 5,557,798 | A |   | 9/1996 | Skeen et al. ............... 395/650 |
| 5,889,953 | A | * | 3/1999 | Thebaut et al. ............ 709/221 |
| 2004/0039803 | A1 | * | 2/2004 | Law ......................... 709/223 |
| 2004/0177139 | A1 | * | 9/2004 | Schuba et al. ............. 709/223 |
| 2006/0155529 | A1 | * | 7/2006 | Ludviksson et al. ........ 704/4 |
| 2006/0265689 | A1 | * | 11/2006 | Kuznetsov et al. ......... 717/117 |
| 2007/0180075 | A1 | * | 8/2007 | Chasman et al. .......... 709/223 |

FOREIGN PATENT DOCUMENTS

WO    WO 01/65417    9/2001

OTHER PUBLICATIONS

Efficient Message Dispatch in Object-Oriented Systems Mayur Naik and Rejeev Kumar Mar. 2000 p. 49-58 ACM SIGPLAN.
Cybernetics and Systems-Towards a Unified Messaging Environment Over the Internet Leonard Chong, Siu Cheung Hui and Chai Kiat Yeo 1999 p. 533-549.
ECOOP ' 95 Object-Oriented Programming Message Dispatch on Pipelined Processors Karel Driesen, Urs Holzle and Jan Vitek 1995 p. 252-282.
Almarode, Jay "Rule-Based Delegation for Prototypes" Proceedings of the Object Oriented Programming Systems Languages and Applications Conference (OOPSLA). New Orleans, Oct. 1-6, 1989. Special Issue of Sigplan Notice, vol. 24, No. 10 Oct. 1989, Reeding, ACM, US., vol. Conf. 4 Oct. 1989.
Paton, Norman W., "Active Database Systems" ACM Computing Surveys, vol. 31, No. 1, Mar. 1999, pp. 63-103.

* cited by examiner

*Primary Examiner*—Larry D Donaghue
*Assistant Examiner*—Nicholas Taylor
(74) *Attorney, Agent, or Firm*—Workman Nydegger (57) ABSTRACT

Deterministic rule-based dispatch of the data structure to a group of one or more methods. After accessing the data structure to be processed, a list of rules is evaluated to identify multiple rules that apply to the dispatch of the data structure. Each of these multiple rules specifies a different group of one or more methods to which the data structure should be dispatched. The multiple rules are resolved to a single prevailing rule that will be applied for the dispatch of the data structure. Then, the computing system dispatches the data structure to the group of one or more methods specified by the prevailing rule. The rule evaluation and prioritization is deterministic for ease in debugging since it may be determined which group of one or more methods processed a data structure should a performance problem arise during the processing. Furthermore, rules may be added, amended, or deleted dynamically.

33 Claims, 3 Drawing Sheets

DETERMINISTIC RULE-BASED DISPATCH OF OBJECTS TO CODE

BACKGROUND OF THE INVENTION

1. The Field of the Invention

The present invention relates to computing technology; and more specifically, to mechanisms for deterministically performing rule-based dispatch of objects to specific code.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

Software can be quite complex, often being compiled or interpreted from many thousands or even millions of lines of source code. In order to provide some organization to the software development process, the task may be broken up into manageable subroutines or methods that perform more specific actions. The methods are then interrelated to perform the more complex functionality of the software as a whole. These methods often receive one or more data structures for processing.

Due to the complexity of the software, it is often a non-trivial task to determine what method should receive a data structure for further processing. For example, when a network service receives a message, the network service must often select between one of potentially many methods to dispatch the message to.

Conventional systems often employ rule-based dispatch in such situations. In particular, a list of rules is kept that provide a mapping between conditions and a method that the data structure is to be dispatched to. Often, there are multiple conditions that apply and multiple rules that apply under the circumstances. Accordingly, it is difficult to foretell in a deterministic manner what method ultimately will process (or has processed) a data structure. If the system were to have a performance deviation during the processing of the data structure, it will be difficult to debug the system since the code that is causing the performance deviation may not be readily identifiable.

Furthermore, in conventional systems, the list of rules is integrated within the executable dispatch code. Accordingly, revising the list or rules involves revising the source code, recompiling, and redistributing the dispatch code. This can take considerable time and resources.

Accordingly, what would be advantageous are mechanisms for performing rule-based dispatch in which it is more predictable what code will process a data structure in cases in which multiple dispatch rules apply, and in which the rules may be more dynamically changed.

BRIEF SUMMARY OF THE INVENTION

The foregoing problems with the prior state of the art are overcome by the principles of the present invention, which may be implemented in a computing system that is capable of dispatching data structures (such as those that contain the information present in messages) for processing by groups of one or more methods. The computing system performs deterministic rule-based dispatch of the data structure to a group of one or more methods for further processing. The dispatch is deterministic despite the existence of multiple rules that conflict regarding where the data structure should be dispatched.

After accessing the data structure to be processed, the computing system evaluates a list of rules to identify multiple rules that apply to the dispatch of the data structure. Each of these multiple rules specifies a different group of one or more methods to which the data structure should be dispatched. The computing system resolves these rules to a single prevailing rule that will be applied for the dispatch of the data structure. Then the computing system dispatches the data structure to the group of one or more methods specified by the prevailing rule.

The rule evaluation and prioritization is deterministic such that it may be reconstructed which group of one or more methods processed a data structure. Since the methods are then known, debugging is greatly simplified should a performance deviation arise while processing the data structure. Furthermore, the list of rules may be maintained independently of the actual dispatch code. For example, the list of rules may be represented using XPATH statements, or in any other structured manner. Changing the rules merely involves adding or deleting rules from the list, or modifying rules in the list. This permits rules to be more dynamically updated as appropriate given ever changing real-time circumstances.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for performing deterministic rule-based dispatch of the data structure to a group of one or more methods for further processing. After accessing the data structure to be processed, the computing system evaluates a list of rules to identify multiple rules that apply to the dispatch of the data structure. Each of these multiple rules specifies a different group of one or more methods to which the data structure should be dispatched. The computing system resolves these rules to a single prevailing rule that will be applied for the dispatch of the data structure. Then the computing system dispatches the data structure to the group of one or more methods specified by the prevailing rule. The rule evaluation and prioritization is deterministic such that it may be reconstructed which group of one or more methods processed a data structure. Since the methods are then known, debugging is greatly simplified should a performance deviation arise while processing the data structure, thereby permitting the rules to be more dynamically updated as appropriate given ever changing real-time circumstances.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

Figure 1:
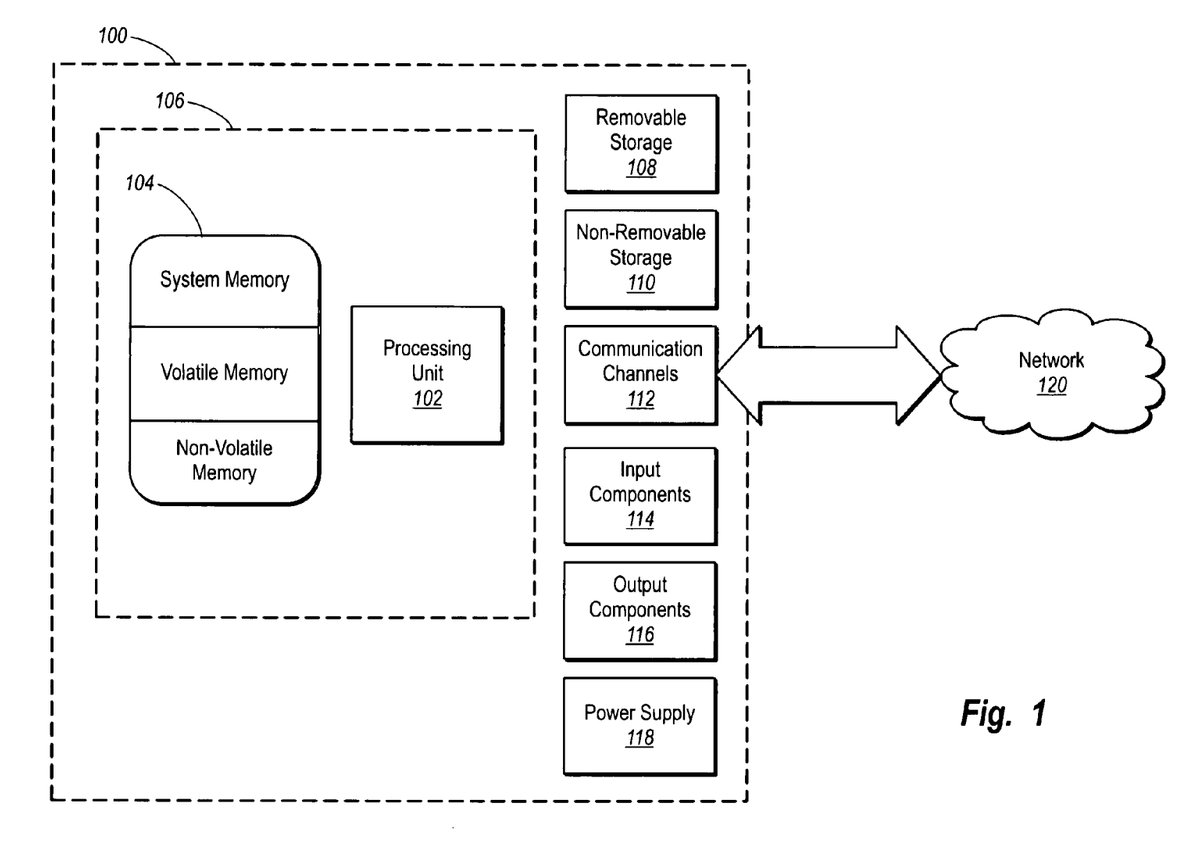
FIG. 1 illustrates a suitable computing system that may implement features of the present invention.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware. FIG. 1 shows a schematic diagram of an example computer architecture usable for these devices.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over a network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
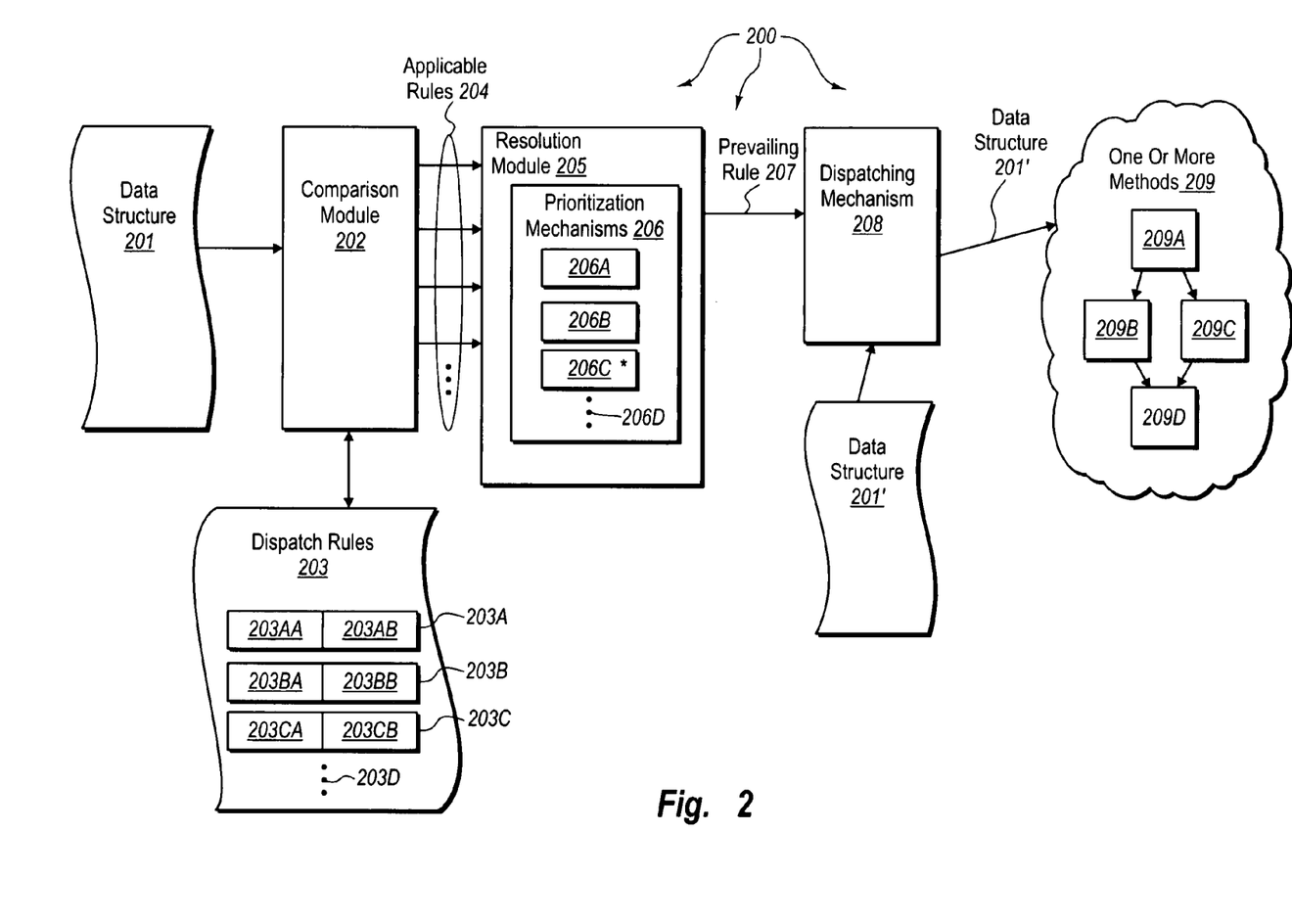
FIG. 2 illustrates various components that may cooperatively interact to perform deterministic rule-based dispatch in accordance with the principles of the present invention.

FIG. 2 illustrates various components 200 that may cooperatively interact to perform deterministic rule-based dispatch in accordance with the principles of the present invention. When implemented in the context of the computing system 100 of FIG. 1, the various components may be instantiated in memory 104 and/or be persisted in persistent memory such as, for example, removable storage 108 and/or non-removable storage 110.

The various components 200 include a list of dispatch rules 203. The list 203 may include any number of dispatch rules. However, in the illustrated embodiment, the list 203 includes rules 203A, 203B, and 203C, amongst potentially others as represented by the vertical ellipses 203D. Each rule specifies a condition and a group of one or more methods a data structure should be dispatched to if the condition is met. For example, rule 203A specifies a condition 203AA and method (s) 203AB, rule 203B specifies a condition 203BA and method(s) 203BB, and rule 203C specifies a condition 203CA and method(s) 203CB. The method(s) specified may be a single method, or may be a group of methods that are performed in a particular ordering.

A comparison module 202 accesses a data structure 201 and evaluates the list of rules 203 to identify multiple rules 204 that apply to the dispatch of the data structure. The applicable rules 204 are then identified to the resolution module 205. The data structure 201 may be, for example, a received message (e.g., a SOAP message), or may be any other data structure accessible by the comparison module 202. The comparison module 202 identifies a rule as being applicable if the corresponding condition for that rule is satisfied. Conditions may be based on a structural characteristic of the data structure 201, on content of the data structure 201, on environmental situations (such as time or computer workload), or on any other factor.

The resolution module 205 contains any number of prioritization mechanisms 206 that are configured to identify a reduced number of rules that take priority in case there are a larger number of rules that conflict. In the illustrated embodiment, the prioritization mechanisms 206 are illustrated as including prioritization mechanisms 206A, 206B, and 206C, amongst potentially others as represented by the vertical ellipses 206D. At least one of the prioritization mechanisms is configured to guaranty that only one rule will prevail in case there are multiple conflicting rules. The prioritization mechanism that guarantees this is represented in FIG. 2 by the prioritization module 206C, which has an asterix at its right side.

The resolution module 205 uses the prioritization mechanisms 206 to identify the prevailing rule 207 that will be applied for the dispatch of the data structure 201. The dispatching mechanism 208 uses the prevailing rule 207 to then deterministically dispatch at least a modified version of the data structure 201' to the corresponding one or more methods 209 that are to be executed. In this example, the data structure is not dispatched to a single method, but is dispatched for processing by methods 209A through 209D.

Some of these methods may also be specified for processing by other rules, although this need not be the case. For example, suppose that rule 203A is the prevailing rule 207 and specifies that the data structure should be dispatched to methods 209. Method 209A may be a method performed as part of groups of dispatch methods that are performed for other rules 203B, 203C, and 203D, as well. Accordingly, the dispatch methods may be shared amongst multiple rules even if the groups of one or more dispatch methods for these rules are different. The data structure 201' that is dispatched may be the same as the data structure 201 accessed by the comparison module 202, although some modification may have been performed if desired.

The rule evaluation and prioritization is deterministic such that it may be reconstructed which group of one or more methods processed a data structure. Since the methods are then known, debugging is greatly simplified should a performance deviation arise while processing the data structure.

Figure 3:
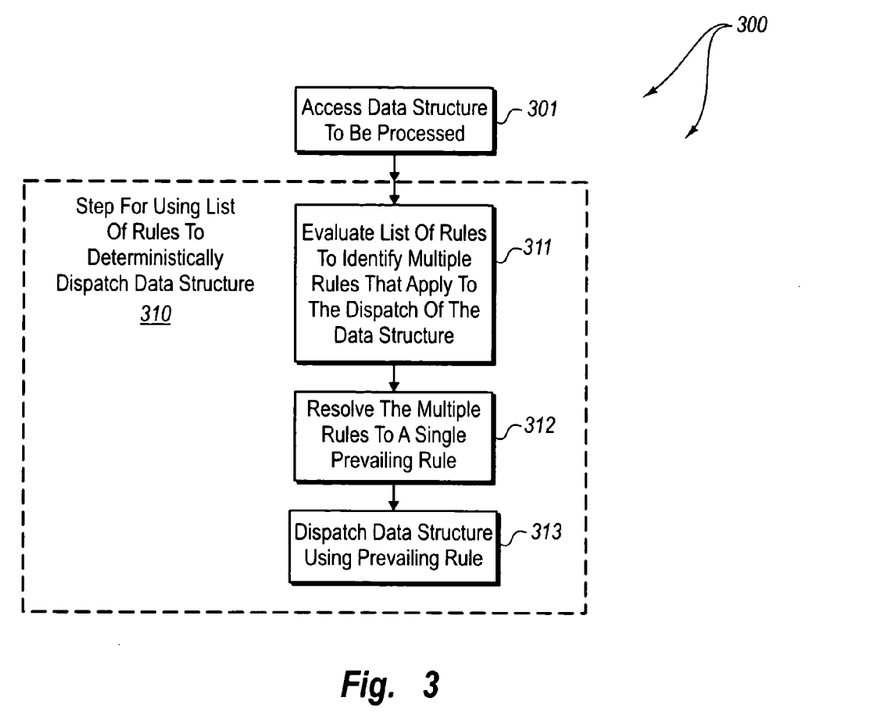
FIG. 3 illustrates a flowchart of a method for the computing system to perform deterministic rule-based dispatch of a data structure in accordance with the principles of the present invention.

FIG. 3 illustrates a flowchart of method 300 for the computing system to perform deterministic rule-based dispatch of the data structure to a group of one or more methods for further processing. Upon accessing a data structure (e.g., receiving a message) that is to be processed (act 301), a functional, result-oriented step for using a list of rules to deterministically dispatch the data structure to a group of one or more methods (step 310) is performed. This may include any corresponding acts that accomplish this result. However, in the illustrated embodiment, the step 310 includes corresponding acts 311, 312, 313.

Specifically, the list of dispatch rules is evaluated to identify a number of rules that apply to the dispatch of the data structure (act 311). As previously mentioned, each of the plurality of rules specifies a different group of one or more methods to which the data structure should be dispatched if the condition is met. In one embodiment, the conditions may be expressed using XPATH statements. This may be particularly useful if the data structure were a SOAP envelope.

The multiple rules are then resolved to identify a prevailing rule that will be applied for the dispatch of the data structure (act 312). The data structure may then be dispatched as specified by the prevailing rules (act 313). In one embodiment, the methods that are processed on the data structure may be on the same computing system as the dispatching mechanism, although that need not be the case. For example, the dispatching mechanism 208 may be located on computing system 100, while the methods 209 are executed on another computing system on the network 120. If the methods 209 were located on another computing system, then dispatching the data structure 201' may involve sending the data structure 201' over the network 120 to the other computing system. The method of FIG. 3 may be repeated for each accessed data structure.

Figure 4:
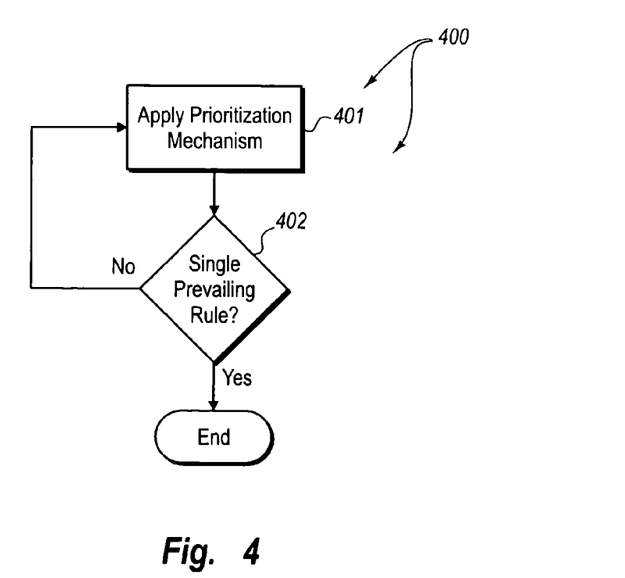
FIG. 4 illustrates a flowchart of a method for resolving multiple rules into a single prevailing rule.

FIG. 4 illustrates a flowchart of a method 400 for resolving multiple rules into a single prevailing rule and represents an example of act 312 of FIG. 3 in further detail. First, a prioritization mechanism as applied to the multiple applicable rules (act 401). It is then determined whether or not the application of the prioritization mechanism resulted in a single prevailing rule (decision block 402). If it did (Yes in decision block 402), then the method 400 ends. Otherwise (No in decision block 402), the process is repeated by continuing to apply different prioritization mechanisms until finally there is only one prevailing rule. In order to guarantee this, the final prioritization mechanism may apply an algorithm that guarantees a single prevailing rule.

Examples of prioritization mechanisms include an express dominance mechanism in which there is an expressed relationship between two conditions such that the relationship specifies which rule will dominate over the other in case they both apply.

Another example is a prioritization level mechanism that assigns a priority level to a rule such that that rule will prevail over any other rule having a lower priority.

Yet another example is a unique identifier comparison mechanism that uses a unique identifier for the condition. The unique identifier may be sorted into a list that represents ordering of priority where conditions having higher unique identifiers on the list take priority over conditions having lower unique identifiers on the list. An example of a unique identifier comparison mechanism may include alphabetically ordering the expression of the rule. In another example, each rule is assigned a unique identifier as an additional field. The unique identifier comparison mechanism represents an example of a prioritization mechanism that guarantees a prevailing rule.

Accordingly, the principles of the present invention allow for deterministic rule-based dispatch. Furthermore, the list of dispatch rules 203 may be maintained independently of the actual dispatch code (e.g., the comparison module 202, the resolution module 205, the prioritization mechanism 207, and the dispatching mechanism 208). For example, the list of rules may be represented using XPATH statements, or in any other structured manner. Changing the rules merely involves adding or deleting rules from the list, or modifying rules in the list.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All which come within the meaning and range of equivalency of the claims, are to be within their scope.

What is claimed and desired secured by United States Letters Patent is:

1. In a computing system that is capable of dispatching a data structure within a Simple Object Access Protocol (SOAP) envelope for processing by groups of one or more software methods, a method for the computing system to perform deterministic rule-based dispatch of the SOAP envelope to a group of one or more software methods for further processing, the dispatch being deterministic and resulting in a single rule despite the existence of multiple rules that conflict regarding which group of one or more software methods the SOAP envelope should be dispatched, the method comprising the following:

an act of the computing system accessing a SOAP envelope that includes a data structure that is to be dispatched to one or more software methods for processing;

subsequent to the act of accessing the SOAP envelope, an act of the computing system evaluating a list of rules to identify a plurality of rules that apply to the dispatch of the data structure within the SOAP envelope, wherein all of the rules within the list of rules are specific to dispatch of the data structure within the SOAP envelope to one or more software methods, such that the list of rules includes rules consisting of software method dispatch rules, and wherein each of the plurality of rules specifying a condition and a group of one or more software methods the SOAP envelope should be dispatched to if the condition is met;

subsequent to the act of evaluating the list of rules, an act of the computing system resolving the plurality of rules utilizing one or more prioritizing mechanisms, wherein at least one prioritizing mechanism is configured to guarantee that only a single rule will be applied for the dispatch of the data structure of the SOAP envelope to the group of one or more software methods; and an act of the computing system dispatching the data structure of the SOAP envelope to the group of one or more software methods specified by the single prevailing rule.

2. A method in accordance with claim 1, wherein the act of resolving the plurality of rules comprises the following:

an act of applying a first prioritization mechanism.

3. A method in accordance with claim 2, wherein the first prioritization mechanism is selected from the group consisting of: an express dominance mechanism, a prioritization level mechanism, and a unique identifier comparison mechanism.

4. A method in accordance with claim 2, wherein the application of the first prioritization mechanism narrows the plurality of rules to a single prevailing rule.

5. A method in accordance with claim 4, wherein the application of the first prioritization mechanism guarantees that only one single rule will prevail under any circumstances from the plurality of rules.

6. A method in accordance with claim 2, wherein the act of resolving the plurality of rules to identify a prevailing rule further comprises the following:

an act of determining that the application of the first prioritization mechanism still resulted in more than one rule; and in response, an act of applying a second prioritization mechanism.

7. A method in accordance with claim 6, wherein the second prioritization mechanism is selected from the group consisting of: an express dominance mechanism, a prioritization level mechanism, and a unique identifier comparison mechanism.

8. A method in accordance with claim 6, wherein the application of the second prioritization mechanism narrows the plurality of rules to a single prevailing rule.

9. A method in accordance with claim 8, wherein the application of the second prioritization mechanism guarantees that only one single rule will prevail under any circumstances from the plurality of rules.

10. A method in accordance with claim 6, wherein the act of resolving the plurality of rules further comprises the following:

an act of determining that the application of the second prioritization mechanism still resulted in more than one rule; and in response, an act of applying a third prioritization mechanism.

11. A method in accordance with claim 10, wherein the third prioritization mechanism is selected from the group consisting of: an express dominance mechanism, a prioritization level mechanism, and a unique identifier comparison mechanism.

12. A method in accordance with claim 10, wherein the application of the third prioritization mechanism narrows the plurality of rules to a single prevailing rule.

13. A method in accordance with claim 12, wherein the application of the third prioritization mechanism guarantees that only one rule will prevail under any circumstances from the plurality of rules.

14. A method in accordance with claim 10, wherein when application of the third prioritization mechanism does not narrow the plurality of rules to a single prevailing rule, the method further comprising the following:

an act of continuing application of prioritization rules until the plurality of rules is narrowed down to just the single prevailing rule.

15. A method in accordance with claim 1, wherein the group of one or more software methods comprises a single method.

16. A method in accordance with claim 1, wherein the group of one or more software methods comprises a temporally-ordered chain of a plurality of software methods.

17. A method in accordance with claim 1, wherein the SOAP envelope is a first SOAP envelope, the plurality of rules is a first plurality of rules, the single rule is a single first prevailing rule, and the group of one or more methods is a first group of one or more software methods, the method further comprising the following:

an act of accessing a second SOAP envelope that is to be processed;

subsequent to the act of accessing a second SOAP envelope, an act of evaluating the list of rules to identify a second plurality of rules that apply to the dispatch of the second SOAP envelope, each of the second plurality of rules specifying a different group of one or more software methods to which the SOAP envelope should be dispatched;

subsequent to the act of evaluating the list of rules, an act of resolving the second plurality of rules to identify a single second prevailing rule that will be applied for the dispatch of the second SOAP envelope; and an act of dispatching the second SOAP envelope to the second group of one or more software methods specified by the single second prevailing rule.

18. A method in accordance with claim 17, wherein the single first prevailing rule is the same as the single second prevailing rule such that the first group of one or more software methods is the same as the second group of one or more software methods.

19. A method in accordance with claim 17, wherein the single first prevailing rule is different than the single second prevailing rule and the first group of one or more software methods is different than the second group of one or more software methods.

20. A method in accordance with claim 19, wherein one or more software methods in the first group of one or more software methods are also in the second group of one or more software methods.

21. A method in accordance with claim 20, wherein the group of one or more software methods are executed by the computing system.

22. A method in accordance with claim 20, wherein the computing system is a first computing system, the group of one or more software methods being executed by a second computing system that the first computing system is capable of communicating with over a network, the act of dispatching the SOAP envelope to the group of one or more software methods comprising the following:
    an act of sending the SOAP envelope to the second computing system over the network.

23. A method in accordance with claim 22, wherein the list or rules is expressed using XPATH statements.

24. A method in accordance with claim 1, wherein the list or rules is expressed using XPATH statements.

25. A method in accordance with claim 1, further comprising:
    an act of accessing an instruction to amend the list of rules; and
    an act of automatically amending the list of rules in response to the instruction.

26. A computer program product for use in a computing system that is capable of dispatching a data structure within a Simple Object Access Protocol (SOAP) envelope for processing by groups of one or more software methods, the computer program product for implementing a method for the computing system to perform deterministic rule-based dispatch of the SOAP envelope to a group of one or more software methods for further processing, the dispatch being deterministic despite the existence of multiple rules that conflict regarding where the SOAP envelope should be dispatched, the computer program product comprising one or more computer-readable storage media that have stored thereon computer-executable instructions that, when executed by one or more processors of the computing system, cause the computing system to perform the following:
    an act of the computing system accessing a SOAP envelope that includes a data structure that is to be dispatched to one or more software methods for processing;
    subsequent to the act of accessing the SOAP envelope, an act of the computing system evaluating the list of rules to identify a plurality of rules that apply to the dispatch of the data structure within the SOAP envelope, wherein all of the rules within the list of rules are specific to dispatch of the data structure within the SOAP envelope to one or more software methods, such that the list of rules includes roles consisting of software method dispatch rules, and wherein each of the plurality of rules specifying a condition and a group of one or more software methods the SOAP envelope should be dispatched to if the condition is met SOAP envelope;
    subsequent to the act of evaluating the list of rules, an act of the computing system resolving the plurality of rules utilizing one or more prioritizing mechanisms, wherein at least one prioritizing mechanism is configured to guarantee only a single rule will be applied for the dispatch of the data structure of the SOAP envelope to the group of one or more methods; and
    an act of the computing system dispatching the data structure of the SOAP envelope to the group of one or more software methods specified by the single prevailing rule.

27. A computer program product in accordance with claim 26, wherein the one or more computer-readable storage media comprises persistent memory.

28. A computer program product in accordance with claim 26, wherein the one or more computer-readable storage media comprises system memory.

29. A computer program product in accordance with claim 26, wherein the act of resolving the plurality of rules comprises the following:
    an act of applying a first prioritization mechanism.

30. A computer program product in accordance with claim 29, wherein the application of the first prioritization mechanism narrows the plurality of rules to a single prevailing rule.

31. A computer program product in accordance with claim 29, wherein application of the first prioritization mechanism does not narrow the plurality of rules to a single prevailing rule, the method further comprising the following:
    an act of continuing application of prioritization rules until the plurality of rules is narrowed down to just the single prevailing rule.

32. A computer program product in accordance with claim 26, the method further comprising:
    an act of accessing an instruction to amend the list of rules; and
    an act of automatically amending the list of rules in response to the instruction.

33. A computing system comprising the following:
    one or more processors;
    system memory;
    one or more computer-readable storage media having stored thereon a list of rules, each rule specifying a condition and a group of one or more software methods that a data structure within a SOAP envelope should be dispatched to if the condition is met, the one or more computer-readable storage media further having stored thereon computer-executable instructions that, when executed by the one or more processors, causes the computing system to instantiate in the system memory the following:
        a comparison module configured to access a SOAP envelope that includes a data structure that is to be dispatched to one or more software methods for processing and evaluate the list of rules to identify a plurality of rules that apply to the dispatch of the SOAP envelope;
        a plurality of prioritization mechanisms configured to identify which conflicting rules take priority, each of the plurality of rules specifying a condition and a group of one or more software methods the SOAP envelope should be dispatched to when the condition is met, at least one of the prioritization mechanisms guarantying only one single prevailing rule will be applied to the dispatch of the data structure of the SOAP envelope and that none of the other rules contained in the list of rules will be applied to the dispatch of the data structure within the SOAP envelope, wherein all of the rules within the list of rules are specific to dispatch of the data structure within the SOAP envelope to one or more software methods, such that the list of rules includes rules consisting of software method dispatch rules;

a resolution module configured to use the plurality of prioritization mechanisms to identify the single prevailing rule that will be applied for the dispatch of the data structure of the SOAP envelope to the one or more software methods specified in the single prevailing rule; and a dispatching mechanism configured to dispatch the data structure of the SOAP envelope to only the group of one or more software methods specified by the single prevailing rule.

* * * * *

UNITED STATES PATENT AND TRADEMARK OFFICE
CERTIFICATE OF CORRECTION

| | | |
|---|---|---|
| PATENT NO. | : 7,624,141 B2 | Page 1 of 1 |
| APPLICATION NO. | : 10/763530 | |
| DATED | : November 24, 2009 | |
| INVENTOR(S) | : Luis Felipe Cabrera et al. | |

It is certified that error appears in the above-identified patent and that said Letters Patent is hereby corrected as shown below:

In column 7, line 6, before "which" insert -- changes, --.

In column 7, line 8, before "within" insert -- embraced --.

In column 8, line 51, in Claim 17, delete "sing1e" and insert -- single --, therefor.

Signed and Sealed this
Tenth Day of May, 2011

David J. Kappos
*Director of the United States Patent and Trademark Office*